May 1, 1962   F. M. CONLEY   3,031,737
METAL-TO-NON-METAL BOND AND METHOD
Filed May 23, 1958   2 Sheets-Sheet 1

INVENTOR.
FRED M. CONLEY
BY Rines and Rines

May 1, 1962 F. M. CONLEY 3,031,737
METAL-TO-NON-METAL BOND AND METHOD
Filed May 23, 1958 2 Sheets-Sheet 2

INVENTOR.
FRED M. CONLEY
BY Rines and Rines
ATTORNEYS

3,031,737
METAL-TO-NON-METAL BOND AND METHOD
Fred M. Conley, Rockland, Mass., assignor to Edgerton, Germeshausen and Grier, Inc., Boston, Mass., a corporation of Massachusetts
Filed May 23, 1958, Ser. No. 737,379
2 Claims. (Cl. 29—155.5)

The present invention relates to metal-to-non-metal surface bonds and methods of bonding and, more particularly, to a titanium-to-ceramic surface bond and method of making the same.

Previously known methods by which titanium and the like can be bonded to ceramic and the like require the bonding of a metallic layer to the ceramic, as by the well-known molybdenum-manganese metallizing process, followed by the brazing of the titanium member to the metallic layer with a suitable alloy such as silver or copper; or by spraying or painting the ceramic surface with a hydride of zirconium or titanium, and then bonding the titanium member thereto with silver solder or BT silver-copper eutectic solder. These processes require firing at high temperatures ranging from the melting point of silver to about 1300° C. Best results are obtained in vacuum which, however, sometimes leads to undesirable evaporation of gases produced during heating which may cause porous bonds. These processes, moreover, not only require very strict quality control, but they are expensive in material, labor and time.

It is, therefore, an object of the present invention to provide a new and improved method of effecting a titanium-to-ceramic bond and the like that shall not be subject to the above-described disadvantages.

A further object is to provide a simple, less costly method of bonding different materials that is also of more general utility.

Still an additional object is to provide a novel bonded structure.

Other and further objects will be explained hereinafter and will be more particularly pointed out in the appended claims. In summary, a specific particular titanium-to-ceramic bonding process of the present invention resides in using an appropriate silver-copper eutectic to braze the titanium member directly to the ceramic member.

The invention will now be explained in connection with the accompanying drawings in which FIG. 1 is a longitudinal section of the titanium or similar member arranged with a brazing alloy and the ceramic or similar member for firing;

Figure 1:
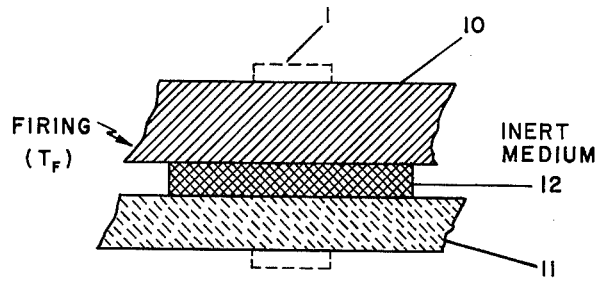
FIG. 1A is a similar view of the members and bond after firing and cooling.

Illustrated in FIG. 1 is a silver-copper eutectic or similar brazing material 12 disposed between and in contact with a non-metal ceramic or similar member 11 and a metal titanium or similar member 10 to which the ceramic member 11 is to be bonded. The silver-copper eutectic 12 may be in powder form disposed in a suitable binder, sheet or wire, not shown. The amount of silver-copper eutectic 12 to be used is not usually critical and, in general, depends upon the area and thickness desired for the bond. The titanium member 10, the silver-copper eutectic 12, and the ceramic member 11 may be held together, as by the clamps 1 or any other convenient means, so as to hold the assembly during the firing and cooling. The assembly is fired in any conventional furnace, schematically represented by the arrowed legend "Firing," having an atmosphere inert to titanium, labelled "Inert Medium" such as helium and the like. This eliminates possible sputtering and bubbling of the alloy, as is customary in the hydride process, before described, as a result of the evaporation in vacuum of gases produced during the decomposition of titanium hydride. Thus, the undesirable possibility of obtaining a porous bond, as sometimes happens with the prior-art hydride process, is completely eliminated by the present invention.

Figure 1A:
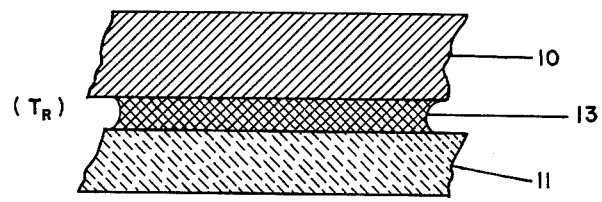

The temperature necessary to accomplish the bond is that at which a portion of the titanium member 10, under the action of the liquified silver-copper eutectic 12, diffuses through or alloys with the silver-copper eutectic 12 and wets the ceramic member 11. The cooling process, while not too critical, should be sufficiently slow to prevent physical damage to the bond that might be caused by internal stresses resulting from unequal contraction of the titanium member 10 and the ceramic member 11, and to prevent damage resulting from violent temperature shock. After cooling to room temperature and removal of the clamping device 1, it has been found that the resulting bond 13, the lateral edges of which have become depressed, as shown in FIG. 1A, is extremely strong. The resulting bond 13 is, in fact, an alloy comprising silver, copper and titanium diffused therethrough.

There are, however, important critical considerations involved in the selection of the metal and non-metal or other different materials to be bonded in accordance with the invention. The before-mentioned problem of the stresses of unequal expansion of the metal and non-metal components of the bonded member is serious. It has, accordingly, been found that best results can be obtained if two conditions are simultaneously satisfied: first, the metal and non-metal components should both have substantially similar expansions at the elevated firing temperature $T_F$ and, preferably, also, at the ultimate room temperature $T_R$ to which the bonded member is cooled; and second, the flow point of the brazing material 12 should be selected to occur substantially at that predetermined temperature $T_F$. With both of these conditions met, the most satisfactory bond can be obtained. If it is not possible to have similar expansions both at temperatures $T_F$ and $T_R$, the geometry of the component parts-to-be-bonded may be arranged so as to compensate for resultant stresses at room temperature $T_R$.

Figure 2:
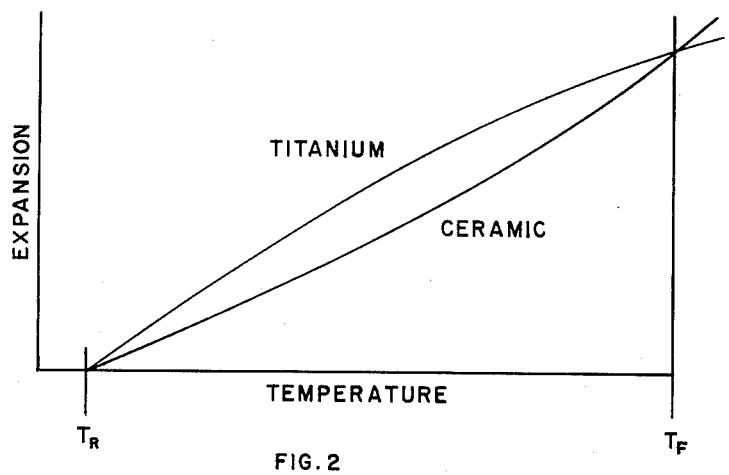
FIG. 2 is a graph illustrating the expansion characteristics of the materials employed in accordance with the invention.

As an illustration, this process has been successfully used to bond commercially pure titanium to "Forsterite" (magnesium-oxide-silica) and to Coors AI–200 ceramic, of alumina and silica. The expansions at room temperature $T_R$ and at an elevated temperature of about 776° C. of such pure titanium and such a ceramic are substantially the same, as illustrated by the left-hand lower and right-hand upper crossing of the graphs of FIG. 2, labelled "Titanium" and "Ceramic." The silver-copper eutectic solder has a flow point substantially at the temperature $T_F$. A longitudinally extending helical winding 20 of commercially pure titanium ribbon, FIG. 3, for example, may be bonded to support rods 21 of the Coors AI–200 ceramic, FIG. 4. The helix 20 may first be wound about a stainless steel form 22, in the direction of the arrow. A small amount of silver-copper eutectic powder or the like in a methocel binder is painted on each turn of helix 20 at points or regions 23 where the support rods 21 are to cross each turn; namely, along the transversely spaced parallel longitudinal lines formed by the regions 23. The support rods 21 are then clamped in position and the assembly placed in a helium atmosphere furnace until the silver-copper eutectic starts to flow. The clamped assembly is then withdrawn from the hot part of the furnace to a cooler part, approximately 200° C., where it is allowed to cool for approximately fifteen minutes. Thereafter, the assembly is removed from the furnace and allowed to cool to room temperature $T_R$, in air. The expansion of the stainless steel form 22 is so much greater than the titanium ribbon 20 that, at the brazing temperature, the helix 20 is forced into the shape of the stainless steel form 22. Upon cooling, the helix 20 forms and sets to the said shape. Since the stainless steel form 22 also contracts more on cooling than the helix 20, it is easily removed, FIG. 4. The bonds between the ceramic support rods 21 and the helix 20 at the regions 23 are extremely strong. In tests, for example, it was found that under a combination of tensile and shear forces, the ceramic support rods 21 fractured long before the bond. It should be noted that, compared with other known processes, the number of steps in this process are reduced. In addition, precise control of the material used and of the time of each process step are not required, as in prior-art techniques.

Figure 3:
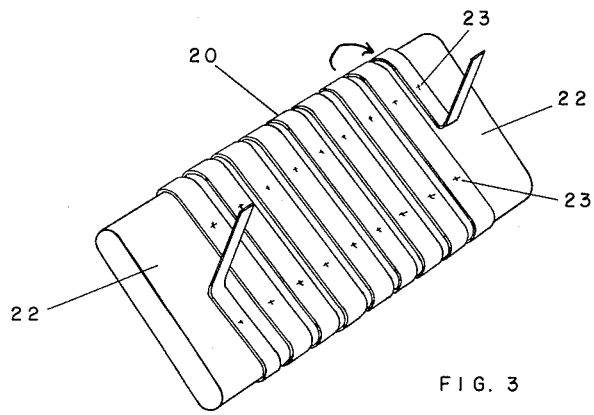
FIG. 3 is a perspective view of the initial steps in the process of bonding ceramic support rods to a titanium helix in accordance with a preferred embodiment of the invention.
Figure 4:
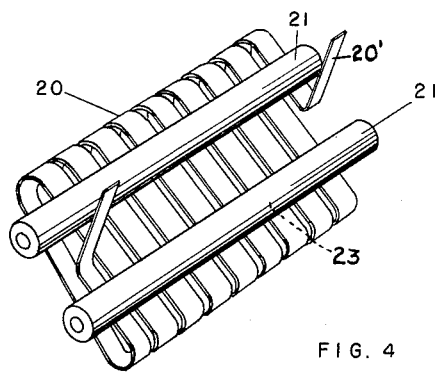
FIG. 4 is a view similar to FIG. 3 of the completed helix.

The process of the present invention also finds particular application in the fabrication of electron-tube and gaseous-discharge tube assemblies and sub-assemblies having titanium or similar members bonded to ceramic or similar members. In fact, the flat oval helical member 20 of FIGS. 3 and 4 is useful in cathode-ray and similar electron tubes as a deflection helix. For such purposes, in order to avoid discontinuities in the transmission-line properties of the deflection device and provide satisfactory mechanical strength, the terminal portions 20′, FIG. 4, should be bent outward of the helix 20 in the space between the support rods 21, the bend forming preferably less than a right-angle, as shown.

Such assemblies and sub-assemblies are non-magnetic and are mechanically strong at operating temperatures. Further, it will be apparent to those skilled in the art that other applications may be made of the process in other arts.

While a particular embodiment of the invention has been shown and described, it will be apparent to those skilled in the art that many changes and modifications may be made without departing from the spirit and scope of the invention in its broadest aspect, and it is intended in the appended claims, therefore, to cover all such changes and modifications as fall within the scope of the invention.

What is claimed is:
1. A method of binding a conductor of substantially commercially pure titanium to a ceramic supporting structure having substantially equal expansions at room temperature and at a high predetermined temperature but having unequal expansions between said temperatures, said ceramic consisting of magnesium-oxide-silica, that comprises, forming the conductor into a winding, applying at predetermined regions along successive turns of the winding a silver-copper brazing material having a eutectic temperature corresponding substantially to the said predetermined temperature, clamping the ceramic supporting structure to said winding along the said predetermined regions, disposing the winding and supporting structure within a medium inert thereto, elevating the winding and supporting structure to the said predetermined temperature, and cooling the same.

2. A method of binding a conductor of substantially commercially pure titanium to a ceramic supporting structure having substantially equal expansions at room temperature and at a high predetermined temperature but having unequal expansions between said temperatures, said ceramic consisting of alumina-silica, that comprises, forming the conductor into a winding, applying at predetermined regions along successive turns of the winding a silver-copper brazing material having a eutectic temperature corresponding substantially to the said predetermined temperature, clamping the ceramic supporting structure to said winding along the said predetermined regions, disposing the winding and supporting structure within a medium inert thereto, elevating the winding and supporting structure to the said predetermined temperature, and cooling the same.

References Cited in the file of this patent

UNITED STATES PATENTS

| | | |
|---|---|---|
| 1,994,534 | Robinson | Mar. 19, 1935 |
| 2,418,804 | Hood | Apr. 8, 1947 |
| 2,570,248 | Kelley | Oct. 9, 1951 |
| 2,761,042 | Scott | Aug. 28, 1956 |
| 2,798,843 | Slomin | July 9, 1957 |
| 2,800,711 | Oliphant | July 30, 1957 |
| 2,844,868 | Cline | July 29, 1958 |
| 2,857,663 | Beggs | Oct. 28, 1958 |
| 2,906,008 | Boegehold | Sept. 29, 1959 |
| 2,941,129 | Horn | June 14, 1960 |
| 2,962,136 | Pincus | Nov. 29, 1960 |

OTHER REFERENCES

Welding Handbook, 3d edition, copyright 1950, pages 865, 866, 511–513.